United States Patent
Krishnamurthy et al.

(10) Patent No.: US 8,656,375 B2
(45) Date of Patent: Feb. 18, 2014

(54) CROSS-LOGICAL ENTITY ACCELERATORS

(75) Inventors: Rajaram B. Krishnamurthy, Wappingers Falls, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 12/610,583

(22) Filed: Nov. 2, 2009

(65) Prior Publication Data
US 2011/0107035 A1    May 5, 2011

(51) Int. Cl.
G06F 9/45    (2006.01)
G06F 15/16   (2006.01)
G06F 9/00    (2006.01)

(52) U.S. Cl.
USPC .......... 717/149; 717/151; 717/159; 717/164; 709/205; 712/227; 718/106

(58) Field of Classification Search
None
See application file for complete search history.

(56) References Cited

U.S. PATENT DOCUMENTS

| | | | |
|---|---|---|---|
| 6,772,415 B1 * | 8/2004 | Danckaert et al. | 717/161 |
| 6,990,663 B1 | 1/2006 | Arndt | |
| 7,299,468 B2 | 11/2007 | Casey et al. | |
| 7,721,144 B2 * | 5/2010 | Brown et al. | 714/6.12 |
| 8,375,374 B2 * | 2/2013 | O'Brien et al. | 717/149 |
| 2002/0010844 A1 | 1/2002 | Noel et al. | |
| 2005/0039184 A1 * | 2/2005 | Kunze et al. | 718/103 |
| 2005/0081201 A1 * | 4/2005 | Aguilar et al. | 718/100 |
| 2005/0108687 A1 * | 5/2005 | Mountain et al. | 717/127 |
| 2005/0193113 A1 * | 9/2005 | Kokusho et al. | 709/225 |
| 2005/0229140 A1 * | 10/2005 | Tsai et al. | 716/17 |
| 2006/0190942 A1 * | 8/2006 | Inoue et al. | 718/100 |
| 2007/0283337 A1 * | 12/2007 | Kasahara et al. | 717/149 |
| 2007/0300036 A1 | 12/2007 | Abbey | |
| 2008/0028408 A1 | 1/2008 | Day et al. | |
| 2008/0034366 A1 | 2/2008 | Tanaka et al. | |
| 2008/0235686 A1 * | 9/2008 | Brenner | 718/101 |
| 2008/0263207 A1 * | 10/2008 | Popescu et al. | 709/226 |
| 2010/0088673 A1 * | 4/2010 | Chen et al. | 717/110 |
| 2010/0161759 A1 * | 6/2010 | Brand | 709/218 |

FOREIGN PATENT DOCUMENTS

| | | |
|---|---|---|
| EP | 1164480 A2 | 12/2001 |
| JP | 2008041093 A | 2/2008 |

OTHER PUBLICATIONS

"z/Architecture—Principles of Operation," IBM Publication No. SA22-7832-07, 8th Edition, Feb. 2009, pp. 1-1344.

* cited by examiner

*Primary Examiner* — Michael Sun
(74) *Attorney, Agent, or Firm* — Steven Chiu, Esq.; Blanche E. Schiller, Esq.; Heslin Rothenberg Farley & Mesiti P.C.

(57) ABSTRACT

A cross-logical entity group is created that includes one or more accelerators to be shared by a plurality of logical entities. Instantiated on the accelerators are functions that are common across multiple logical entities. The functions to be instantiated are determined, for instance, dynamically during run-time.

17 Claims, 4 Drawing Sheets

300
FUNCTION TABLE

| FUNCTION NAME 304 | LINKED LIST OF SHARERS 306 | LIST OF I/O UTILIZATION 308 | LIST OF COMPUTE UTILIZATION 310 |
|---|---|---|---|
|  |  |  |  |
|  |  |  |  |
| ... | ... | ... | ... |
| FUNCTION NAME | LINKED LIST OF SHARERS | LIST OF I/O UTILIZATION | LIST OF COMPUTE UTILIZATION |

400
SHARED TABLE

| ACCEL. ID 404 | LINKED LIST OF FUNCTIONS 406 | I/O UTILIZATION 408 | COMPUTE UTILIZATION 410 |
|---|---|---|---|
|  |  |  |  |
|  |  |  |  |
| ... | ... | ... | ... |
| ACCEL. ID | LINKED LIST OF FUNCTIONS | I/O UTILIZATION | COMPUTE UTILIZATION |

CROSS-LOGICAL ENTITY ACCELERATORS

BACKGROUND

This invention relates, in general, to facilitating processing within a computing environment, and in particular, to improving the use of accelerators within the computing environment.

Accelerators are used today to increase the processing capabilities of a server. In particular, accelerators coupled to the server are optimized to perform certain functions, enabling those functions to be performed at higher speeds than if those functions were performed by the server. When a function is reached in a program executed by the server, the server sends a request to the accelerator to perform the function. The accelerator performs the function and forwards the result back to the server. The server either performs further processing on the returned result or simply forwards the result to another accelerator, which then performs processing and sends the result back to the server, again.

In computing environments that include logical partitions (or other logical entities), each logical partition has its own set of accelerators to perform functions for the programs executing within that logical partition.

BRIEF SUMMARY

To improve efficiency, however, a cross-logical entity group of one or more accelerators is provided. In this group of accelerators, functions that are common across logical entities are instantiated on the accelerators of the group. Then, a request for a shared function is forwarded from a logical entity to the cross-logical entity accelerator group to be performed by an accelerator of that group.

The shortcomings of the prior art are overcome and additional advantages are provided through the provision of a computer program product for facilitating processing within a computing environment. The computer program product includes a storage medium readable by a processing circuit and storing instructions for execution by the processing circuit for performing a method. The method includes, for instance, determining, by a processor, whether a function is to be included in a group of one or more accelerators to be shared by a plurality of logical entities of the computing environment; and including, by the processor, the function in the group, in response to the determining indicating the function is to be included in the group.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3 depicts one example of a function table used in accordance with an aspect of the present invention;

FIG. 4 depicts one example of a shared table used in accordance with an aspect of the present invention.

DETAILED DESCRIPTION

In accordance with an aspect of the present invention, a cross-logical entity accelerator group is provided. Accelerator functions that are common across a plurality of logical entities are instantiated on accelerators within this group. The determination of which functions are to be instantiated on the cross-logical entity group is made, for instance, dynamically during runtime.

A logical entity (or system software logical abstraction) represents, for instance, a granularity of computation. Examples of logical entities include threads; processes or address spaces; logical partitions (LPAR); and containers. A process/address space includes one or more threads, and a logical partition or container includes one or more address spaces/processes. As an example, a container provides a mechanism for isolating resources and security in an operating system framework without using a hypervisor. In a particular example described herein, the logical entity is a logical partition, and therefore, the cross-logical entity group is referred to as a cross-LPAR group. Although the examples refer to logical partitions, one or more aspects of the present invention are applicable to other logical entities.

Figure 1A:
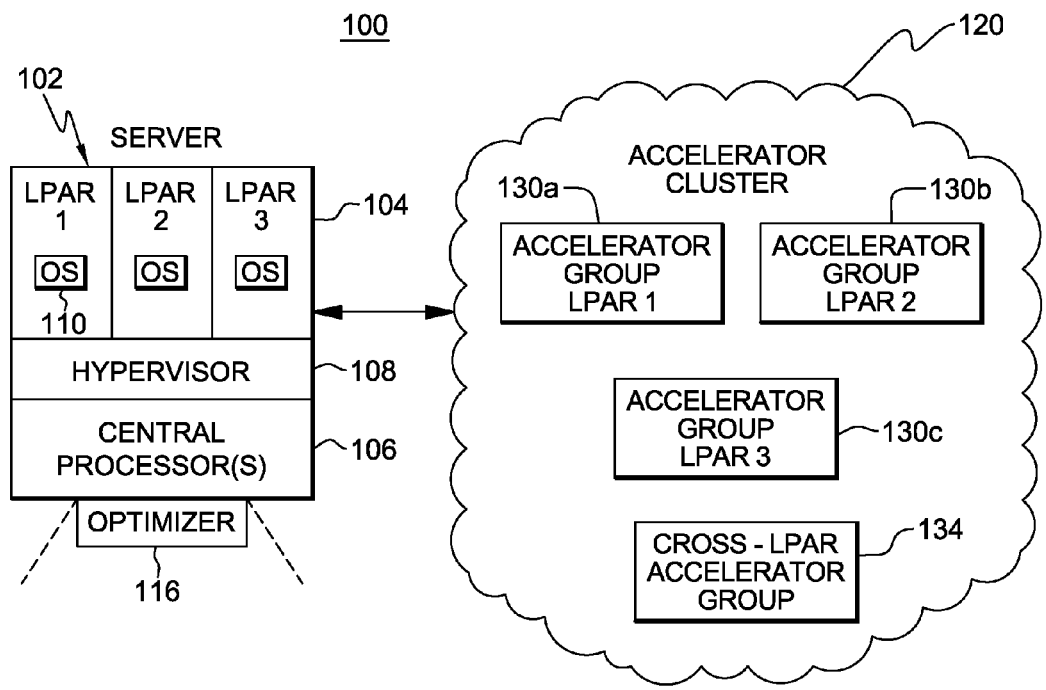
FIG. 1A depicts one example of a computing environment to incorporate and use one or more aspects of the present invention.

One embodiment of a computing environment to incorporate and use one or more aspects of the present invention is described with reference to FIG. 1A. Computing environment 100 is based, for instance, on the z/Architecture® offered by International Business Machines Corporation, Armonk, N.Y. The z/Architecture® is described in an IBM® publication entitled, "z/Architecture Principles of Operation," IBM Publication No. SA22-7832-07, February 2009, which is hereby incorporated herein by reference in its entirety. IBM® and z/Architecture® are registered trademarks of International Business Machines Corporation, Armonk, N.Y., U.S.A. Other names used herein may be registered trademarks, trademarks or product names of International Business Machines Corporation or other companies.

As one example, computing environment 100 includes a server 102, such as a System z® server offered by International Business Machines Corporation, which includes, for instance, one or more partitions or zones 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and Licensed Internal Code (also referred to as microcode or millicode) keeps a program in a logical partition from interfering with a program in a different logical partition. This allows several different logical partitions to operate on a single or multiple physical processors in a time sliced manner. In this particular example, each logical partition has a resident operating system 110, which may differ for one or more logical partitions. In one embodiment, operating system 110 is the z/OS® operating system, offered by International Business Machines Corporation, Armonk, N.Y. System z® and z/OS® are registered trademarks of International Business Machines Corporation.

Central processors 106 are physical processor resources that are allocated to the logical partitions. For instance, a logical partition 104 includes one or more logical processors, each of which represents all or a share of a physical processor resource 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors. One example of hypervisor 108 is the Processor Resource/Systems Manager (PR/SM), offered by International Business Machines Corporation, Armonk, N.Y.

In this embodiment, one or more of the central processors executes an optimizer 116 used in accordance with one or more aspects of the present invention to instantiate functions on a cross-LPAR accelerator group, as described in further detail below.

Figure 1B:
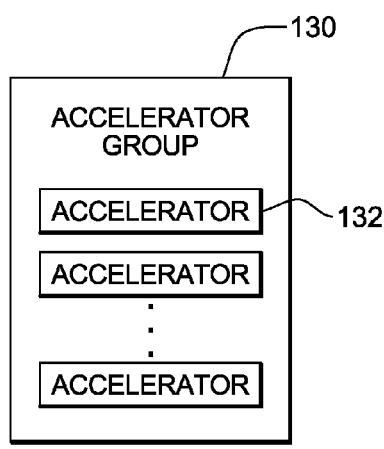
FIG. 1B depicts one example of an accelerator group used in accordance with an aspect of the present invention.

Server 102 is coupled to and communicates with an accelerator cluster 120 via, for instance, a network, such as PCI express, Infiniband, Ethernet, etc. Accelerator cluster 120 includes, for instance, a plurality of accelerator groups 130 (e.g., groups 130a-130c), in which each group 130 includes one or more hardware accelerators 132 (FIG. 1B), such as blades in a blade center or chassis. As examples, accelerators could be IBM® Cell BE blades; IBM® Datapower units; nVidia GPUs; and/or System p® or System x® blades, offered by International Business Machines Corporation. A group of accelerators may include the same accelerators or a mix of accelerators. Similarly, one group can have the same or different accelerators than another group. System p® and System x® are registered trademarks of International Business Machines Corporation.

In one example, each accelerator has a switch associated therewith having at least one port as an input port from the server and one port as an output port to the server. Each accelerator group 130 is assigned to a particular logical partition. For instance, accelerator group 130a (FIG. 1a) is assigned to LPAR1; accelerator group 130b is assigned to LPAR2; and accelerator group 130c is assigned to LPAR3, in this example. Although, in this example, three accelerator groups (130) are shown, it will be understood that more or less accelerator groups may be included. Further, each group can have more or less accelerators than shown in FIG. 1B, and one accelerator group can have a different number or the same number of accelerators as another group.

Additionally, accelerator cluster 120 includes at least one cross-LPAR accelerator group 134. This accelerator group includes one or more accelerators having functions thereon usable by multiple logical partitions. In particular, accelerator functions that are common across multiple LPARs are instantiated on the accelerators of this group. For instance, a function F1 that is used by LPAR1 and LPAR3 may be instantiated on accelerator 1 of cross-LPAR group 134. In one example, each accelerator in the group can support a separate queue for each LPAR, in which a request received from a particular LPAR is placed in the queue of that LPAR awaiting execution. In another embodiment, each accelerator has one queue that is used to store requests for multiple LPARs.

One embodiment of the logic used to instantiate functions on the cross-LPAR group is described with reference to FIG. 2. In one embodiment, optimizer 116 (FIG. 1A) executing on the server is used to perform this logic, unless otherwise specified.

Figure 2:
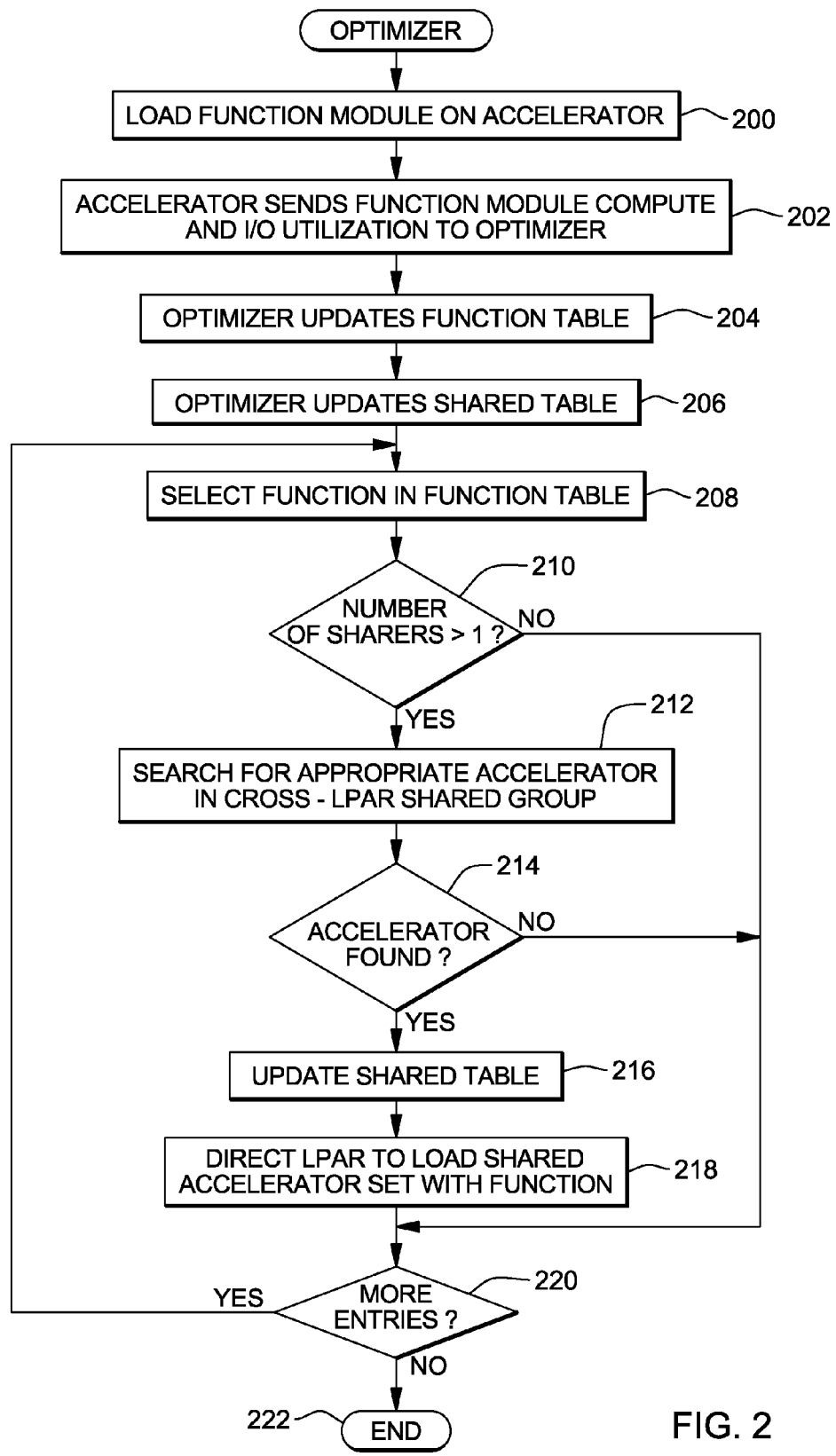
FIG. 2 depicts one embodiment of the logic used to instantiate accelerator functions on a cross-LPAR accelerator group, in accordance with an aspect of the present invention.

Referring to FIG. 2, initially, the server (e.g., an address space of the server) loads a function module on an accelerator assigned to that address space, STEP 200. For instance, LPAR1 loads a function module on an accelerator within the LPAR1 accelerator group. Further, LPAR1 updates the optimizer with the name of the accelerator function, and the optimizer updates its function table, described below. As the function executes, compute utilization and I/O utilization (e.g., utilization on link to storage and/or utilization on network link to server) are measured by, for instance, a run-time profiler running on the accelerator. As an example, compute utilization is an ordered pair that includes, for instance, processor core utilization and memory bandwidth utilization. Processor core utilization is, for example the percentage of time the compute core of an accelerator is busy (e.g., sum of % user and % kernel time queried from, for instance, an OS kernel). Memory bandwidth utilization is the percentage of memory bandwidth used up by all cores of an accelerator. This can be queried from an OS kernel or a memory bus controller, as examples. I/O utilization is, for example, the percentage of time in total from I/O, storage and network operations; again polled from an OS kernel, as an example.

In response thereto, the accelerator sends the function module compute and I/O utilization values (e.g., average of those values over a specified time) to the application optimizer running on the server, STEP 204. The application optimizer updates this information in a data structure, such as a table, STEP 204. For instance, a function table 300 (FIG. 3) includes one or more entries 302, and each entry includes, for instance, a function name 304; a linked list of sharers 306; a list of I/O utilization for that function on each accelerator 308; and a list of compute utilization for the function on each accelerator 310.

The optimizer also maintains a data structure of accelerators in the cross-LPAR shared group, STEP 206. For example, a shared table 400 (FIG. 4) is maintained that includes, for instance, an accelerator identifier 404 for each accelerator in the shared group; a linked list of functions 406 executing on that accelerator; total I/O utilization 408 for the accelerator; and total compute utilization 410 for the accelerator.

The optimizer loops through entries in the function table to determine which functions are to be placed on the cross-LPAR accelerator group. For instance, a function in the function table is selected, STEP 208. A determination is made as to whether the number of sharers (e.g., LPARs) of this function is greater than one, INQUIRY 210. If the linked list of sharers indicates that the number of sharers is greater than 1, then the function is a candidate for sharing. The optimizer may also use, in other embodiments, additional rules to choose a candidate function for sharing. For example, it may choose a function that has a number of sharers greater than a designer defined threshold, and aggregate I/O/compute utilization greater than a designer defined threshold. Other examples also exist.

A search is performed for an appropriate accelerator in the cross-LPAR shared group to which this function may be added, STEP 212. In particular, a search of the shared accelerators in the group is performed to find one that is capable of performing the function. For instance, a search is undertaken for an accelerator in the cross-LPAR shared group in which n+N<Nmax and c+C<Cmax, where n, c are function I/O (n) and compute (c) utilization values aggregated across the LPAR-private accelerators (e.g., the sum (or other statistical operation) of values in columns 308, 310, respectively, in table 300 (FIG. 3)); N,C are I/O (N) and compute (C) utilization totals for a given accelerator in a shared accelerator group (see, e.g., columns 408, 410, respectively, in shared table 400 (FIG. 4)); and Nmax and Cmax are designer chosen values (e.g., 80%) that can be changed at runtime.

Should an accelerator in the shared group meet the above criteria, then it is chosen for placement of the function, INQUIRY 214 (FIG. 2). If more than one accelerator meets the criteria, then one of them is chosen either randomly or based on a further criterion (e.g., first one found, more utilization available, etc.). In response to selecting the accelerator, the shared table is updated with, for instance, a function name (406; FIG. 4), and n and c are added to the totals of N (408) and C (410), respectively, STEP 216. Further, one LPAR is selected and directed to load the function on the accelerator of the shared accelerator group, STEP 218. The LPAR then steers subsequent requests to the shared accelerators.

Thereafter, or if the number of sharers is equal to one, INQUIRY 210, or if an accelerator is not found, INQUIRY 214, a determination is made as to whether there are more entries in the function table to be processed, INQUIRY 220. If there are more entries, then processing continues with STEP 208. Otherwise, processing is complete, STEP 222. The above steps may be invoked by the optimizer periodically and/or can be event triggered. For example, a triggering event may be that at least one function has more than one sharer, or the I/O and compute utilization totals for a function with multiple LPAR sharers is greater than a designer defined threshold. Other examples also exist.

Described in detail above is a technique for dynamically determining which functions, if any, are to be placed on accelerators within a cross-LPAR accelerator group. It is likely that certain accelerator functions are common between accelerator groups. If so, these functions may be placed on accelerators that can be shared between LPARs. The accelerator within the group to be selected to have a particular function instantiated thereon depends, in one example, on the compute and I/O utilization of the function. Using the technique described herein, in one example, a function F can be extracted from each of the LPAR 1, 2 and 3 accelerator groups and installed on a new accelerator cross-LPAR group. Assuming the utilization of F in LPARs 1, 2 and 3 are 0.2, 0.2 and 0.3, the utilization of F on the shared group is U=0.2+0.2+0.3=0.7. This allows the accelerator function to be run with maximal utilization in the cross-LPAR shared accelerator group. This also reduces the accelerator count in a given application which has direct implications on accelerator footprint size and energy consumption. It allows the LPAR-private (i.e., non-shared) accelerators to be used for other functions as the shared function F is now running in the cross-LPAR shared accelerator group.

In another aspect of the present invention, shared functions may be pre-located (instead of or in addition to dynamically locating during workload execution) on cross-LPAR accelerator groups, if, for instance, certain functions are known to be highly utilized. In this embodiment, LPARs communicate use of all functions to the optimizer before the LPAR makes requests to accelerators. Known functions of high utilization are provided by the system programmer to the optimizer. Knowledge of highly utilized functions may be gleaned from a previous workload run. The optimizer can then place these shared functions on the cross-LPAR shared group. The optimizer can activate these functions when run-time conditions (shared, I/O/compute utilization) warrant use of the shared accelerator group. Alternatively, the optimizer can communicate the locations to the LPARs before they begin to submit request for acceleration. LPARs may then use these pre-located shared functions directly upon address space invocation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
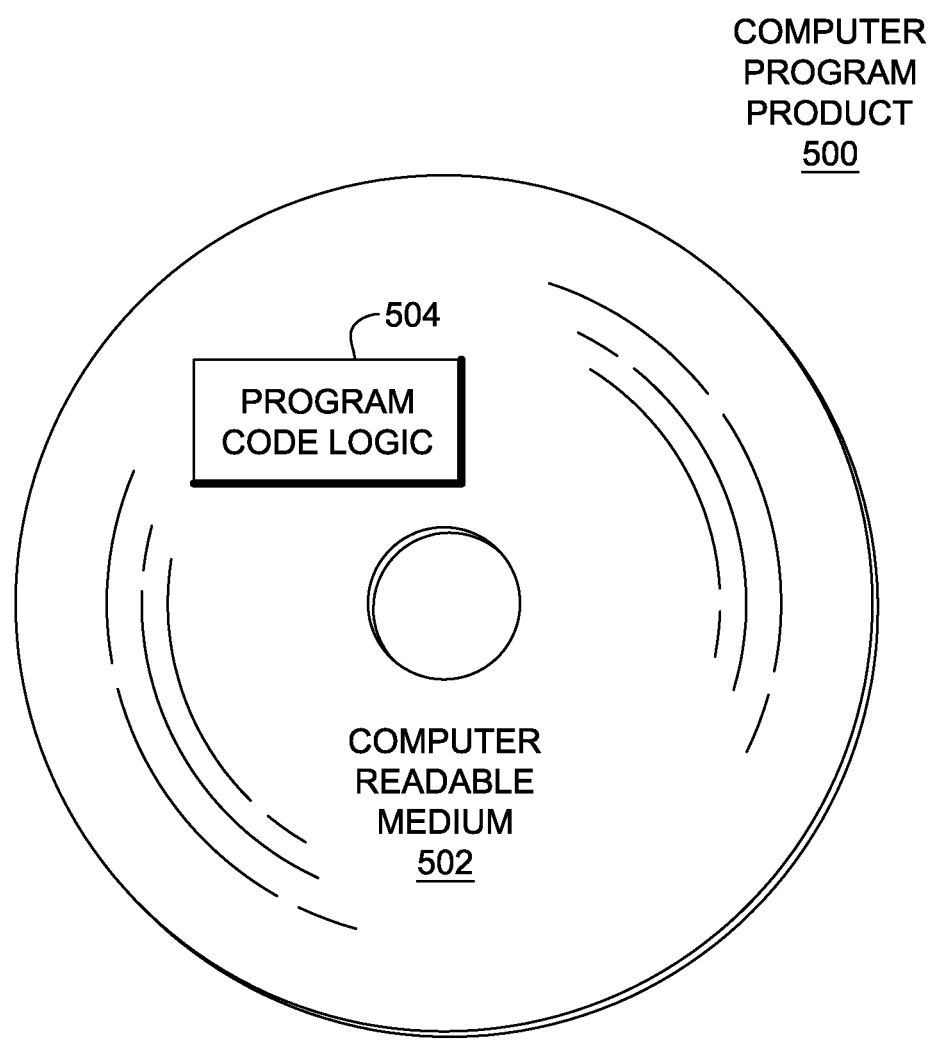
FIG. 5 depicts one embodiment of a computer program product incorporating one or more aspects of the present invention.

Referring now to FIG. 5, in one example, a computer program product 500 includes, for instance, one or more computer readable media 502 to store computer readable program code means or logic 504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other types of accelerators may be used. Further, there may be more or less accelerator groups, more or less accelerators in each group, and an accelerator may run one or more functions. Further, there may be more than one shared accelerator group, and each shared group may have more or less accelerators than described herein or with respect to one another. Moreover, data structures other than tables may be used, and other information may be stored. Still further, other criteria may be used to select the accelerators to execute the functions. Many other variations are possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating processing within a computing environment, the computer program product comprising:
   a non-transitory storage medium readable by a processing circuit and storing instructions for execution by the processing circuit for performing a method comprising:
      determining whether a function is to be included in a group of one or more accelerators to be shared by a plurality of logical entities of the computing environment, the group of one or more accelerators being separate from the plurality of logical entities, and the determining comprising checking whether the function is to be shared by multiple logical entities of the plurality of logical entities; and
      including the function in the group, based on the checking indicating the function is to be shared by the multiple logical entities, wherein the function is executable by the multiple logical entities that are to share the group of one or more accelerators.

2. The computer program product of claim 1, wherein the method further comprises selecting an accelerator of the group on which to include the function.

3. The computer program product of claim 2, wherein the selecting comprises:
   searching the group of one or more accelerators for at least one accelerator in which $n+N <N\,max$ and $c+C <C\,max$, where n is I/O utilization of a function across private accelerators, c is compute utilization of a function across private accelerators, N is I/O utilization for an accelerator in the group, C is compute utilization for an accelerator in the group, N max is a selected value for I/O utilization and C max is a selected value for compute utilization; and
   choosing from the at least one accelerator found in the search, the accelerator on which to include the function.

4. The computer program product of claim 3, wherein at least one of N max and C max are changeable at runtime.

5. The computer program product of claim 1, wherein the including comprises:
   loading the function on an accelerator of the group; and
   updating a data structure with one or more attributes of the function.

6. The computer program product of claim 5, wherein the attributes include at least one of an identifier of the function, compute utilization for the function across accelerators, and I/O utilization for the function across accelerators.

7. The computer program product of claim 5, wherein the method further comprises sending multiple requests for the function to the accelerator, wherein the multiple requests are from multiple logical entities.

8. The computer program product of claim 1, wherein a logical entity of the plurality of logical entities also has associated therewith a private accelerator group that includes one or more functions exclusive to the logical entity.

9. The computer program product of claim 1, wherein the determining is performed by an optimizer executing on a processor, the processor separate from the plurality of logical entities.

10. A computer system for facilitating processing within a computing environment, the computer system comprising:
    a memory; and
    a processor in communications with the memory, wherein the computer system is configured to perform a method, said method comprising:
       determining whether a function is to be included in a group of one or more accelerators to be shared by a plurality of logical entities of the computing environment, the group of one or more accelerators being separate from the plurality of logical entities, and the determining comprising checking whether the function is to be shared by multiple logical entities of the plurality of logical entities; and
       including the function in the group, based on the checking indicating the function is to be shared by the multiple logical entities, wherein the function is executable by the multiple logical entities that are to share the group of one or more accelerators.

11. The computer system of claim 10, wherein the method further comprises selecting an accelerator of the group on which to include the function.

12. The computer system of claim 11, wherein the selecting comprises:

searching the group of one or more accelerators for at least one accelerator in which n +N <N max and c +C <C max, where n is I/O utilization of a function across private accelerators, c is compute utilization of a function across private accelerators, N is I/O utilization for an accelerator in the group, C is compute utilization for an accelerator in the group, N max is a selected value for I/O utilization and C max is a selected value for compute utilization; and choosing from the at least one accelerator found in the search, the accelerator on which to include the function.

13. The computer system of claim 10, wherein the including comprises:

loading the function on an accelerator of the group; and
updating a data structure with one or more attributes of the function.

14. The computer system of claim 13, wherein the method further comprises sending multiple requests for the function to the accelerator, wherein the multiple requests are from multiple logical entities.

15. The computer system of claim 10, wherein a logical entity of the plurality of logical entities also has associated therewith a private accelerator group that includes one or more functions exclusive to the logical entity.

16. A method of facilitating processing within a computing environment, said method comprising:

determining, by a processor, whether a function is to be included in a group of one or more accelerators to be shared by a plurality of logical entities of the computing environment, the group of one or more accelerators being separate from the plurality of logical entities, and the determining comprising checking whether the function is to be shared by multiple logical entities of the plurality of logical entities; and including, by the processor, the function in the group, based on the checking indicating the function is to be shared by the multiple logical entities, wherein the function is executable by the multiple logical entities that are to share the group of one or more accelerators.

17. The method of claim 16, further comprising selecting an accelerator of the group on which to include the function, wherein the selecting comprises:

searching the group of one or more accelerators for at least one accelerator in which n+N <N max and c +C <C max, where n is I/O utilization of a function across private accelerators, c is compute utilization of a function across private accelerators, N is I/O utilization for an accelerator in the group, C is compute utilization for an accelerator in the group, N max is a selected value for I/O utilization and C max is a selected value for compute utilization; and choosing from the at least one accelerator found in the search, the accelerator on which to include the function.

* * * * *